Dec. 16, 1969  G. B. IRELAND  3,484,634
EQUALIZER COIL ARRANGEMENT FOR DC COMMUTATORS
Filed June 20, 1968  3 Sheets-Sheet 1
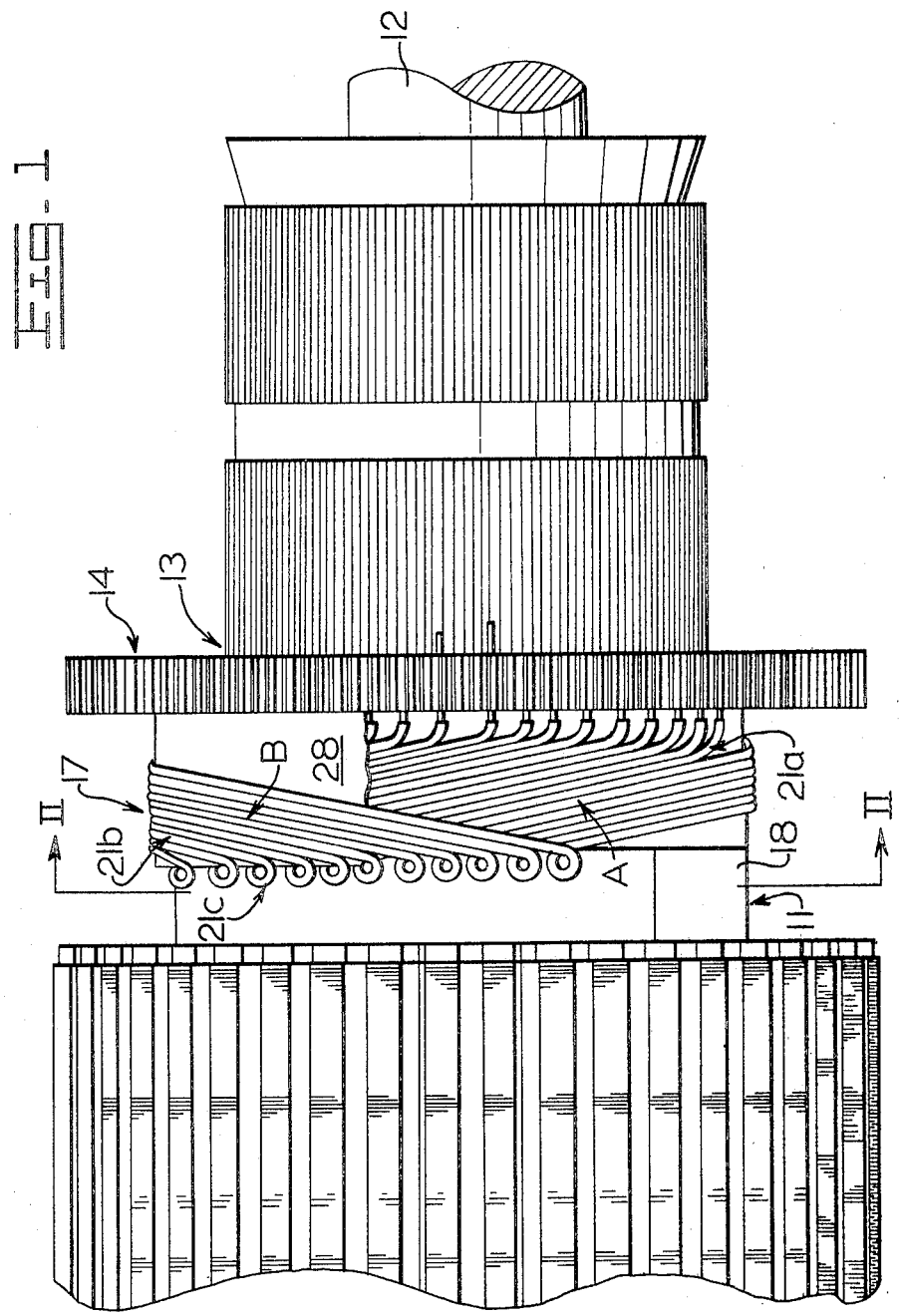
INVENTOR
GERALD B. IRELAND
BY
ATTORNEYS

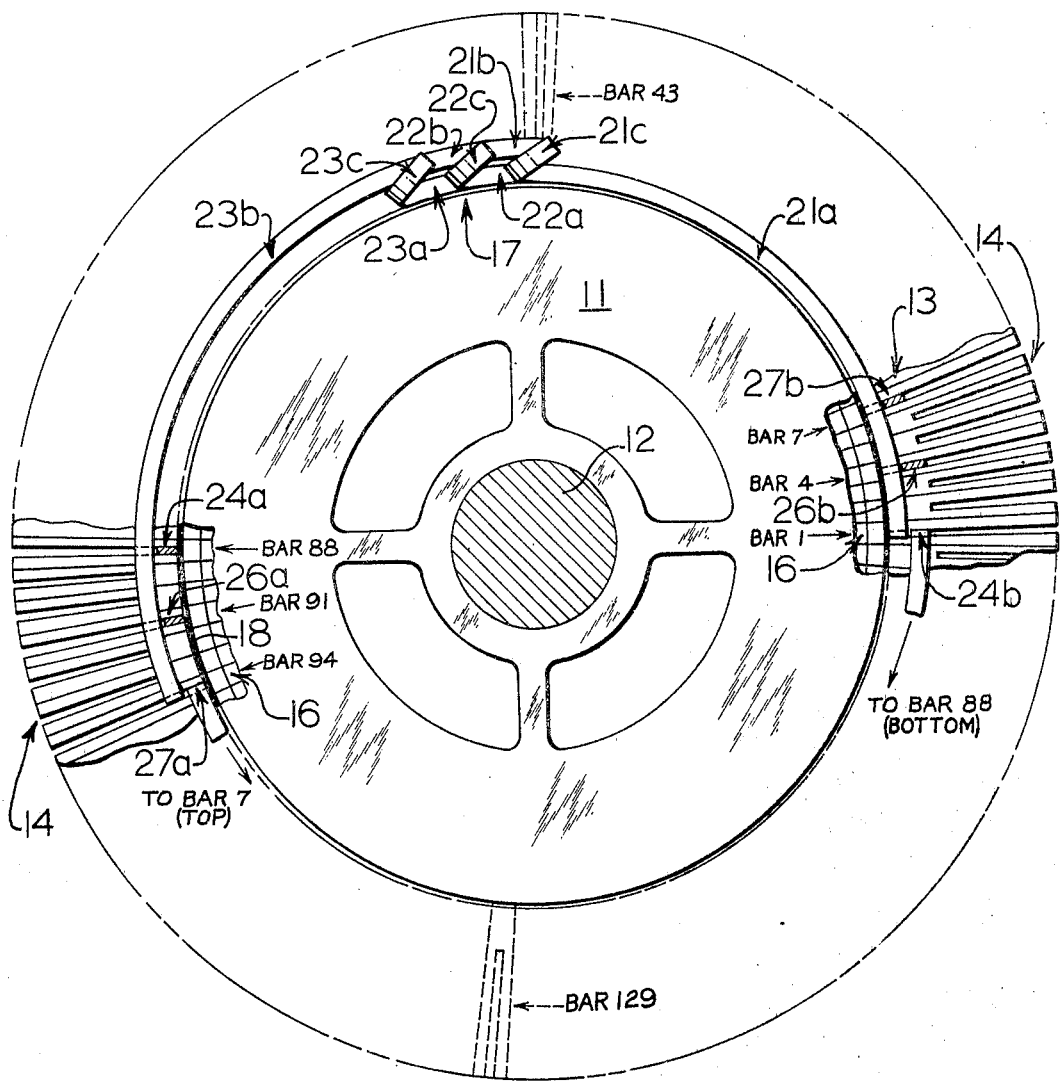

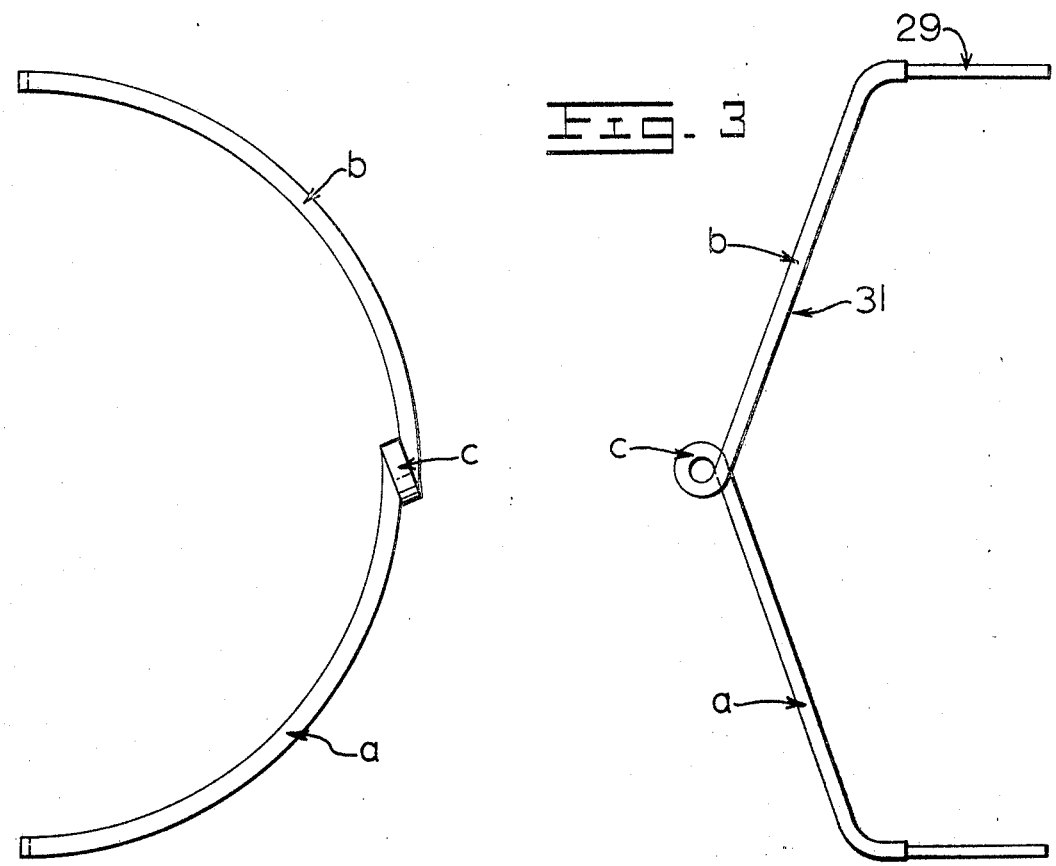

United States Patent Office
3,484,634
Patented Dec. 16, 1969

3,484,634
EQUALIZER COIL ARRANGEMENT FOR
DC COMMUTATORS
Gerald B. Ireland, Morton, Ill., assignor to Caterpillar
Tractor Co., Peoria, Ill., a corporation of California
Filed June 20, 1968, Ser. No. 738,454
Int. Cl. H02k 3/04
U.S. Cl. 310—204                                           7 Claims

ABSTRACT OF THE DISCLOSURE

An equalizer coil arrangement for DC commutators wherein the equalizer coils have legs for periodic connection to circumferentially spaced bars on the commutator with the opposite legs of the equalizer coils forming concentric cylindrical courses. The transition sections of the coils are preinsulated and are formed along generally helical paths with constant curvature to reduce stressing of the conductive metal in the coils and to prevent damage to the insulation during forming of the coils.

---

The present invention is concerned with the configuration and arrangement of equalizer coils on DC electrical machinery such as generators and motors. The use of equalizer coils in such machinery is old in itself. However, the present invention is particularly concerned with the configuration and arrangement of the equalizer coils to minimize stressing in the transition section of the coils, to permit preinsulation of the transition section of the coils so that the insulation is not damaged during formation of the transition section and to make the equalizer coil assembly more compact.

Equalizer coils are employed on DC machinery to minimize circulating armature currents and to improve commutation. These coils are most commonly employed on lap-wound armatures which are to rotate between any selected number of opposing poles or brushes having opposite polarities. If the armature or its construction deviates from a centered position between the brushes, circulating current may pass through the armature windings and the brushes in combination to cause undesirable sparking, loss of electrical energy and heat generation. Equalizer coils overcome this problem by providing a low-resistance path between commutator bars so that circulating currents flow through the equalizing circuit rather than through the brushes. Equalizer connections may be made in several ways. However, the equalizer coils are commonly connected between commutator bars having circumferential spacing about the commutator equal to the span between adjacent like poles or brushes. For example, the span would be 360 electrical degrees which would correspond to 180 mechanical degrees for a four-pole machine, 120 mechanical degrees for a six-pole machine, etc. Depending upon design consideration and the degree of equalization desired, the equalizer coils are periodically connected to all of the commutator bars or to each second bar, each third bar, etc.

The problem toward which the present invention is directed arises since each of the equalizer coils has opposite legs connected to the circumferentially spaced commutator bars. To permit arrangement of a number of the coils upon a single armature, the legs must generally be formed at relative angles to each other and must follow a generally cylindrical path while extending for some distance in an axial direction from the commutator bars. Transition sections in the coils provide a connection between their leg sections with the transition sections necessarily doubling back upon themselves to some degree. In the prior art, the most conventional approach has been to bend the transition section of the equalizer coils sharply about the edge of a sheet of insulative material in a manner similar to the head of a hairpin. Numerous problems have arisen from this practice particularly in heavy duty DC motors and generators where the armatures are required to carry high currents. During rotation of the armature, the equalizer coils are subjected to high rotational speeds under widely varying load conditions. Vibration and centrifugal forces associated with high speed operation as well as contraction and expansion of the coils due to thermal changes in their environment commonly result in poor fatigue life for the equalizer coils. Such failure has been noted to occur most commonly in the transition section of the coils and more particularly in the doubled back portion of the transition section where coining or cold working of the metal tends to create high stresses. These failures are particularly undesirable because of the complex construction of the armatures and the excessive amount of repair time necessary to replace each of the equalizer coils.

Accordingly, it is an object of the present invention to provide an equalizer conductor which is not subjected to excessive stresses during its forming for association with a rotating armature.

It is a further object to simplify the construction and arrangement of the equalizer coils and further to achieve a more compact equalizer coil arrangement upon a rotatable armature while maintaining the above characteristics.

It is another object to employ equalizer members having preinsulation at least about their transition section and permitting forming of the members for use with an armature without damage to the preinsulation.

It is a still further object to provide an effective expansion loop within the transition section of the equalizer coils to accommodate expansion and contraction along the length of the equalizer member.

Additional objects and advantages of the present invention are made apparent in the following description having reference to the accompanying drawings.

In the drawings:

FIG. 1 is a side view of an armature for a DC machine including an arrangement of equalizer coils according to the present invention;

FIG. 2 is a section view taken along lines II—II of FIG. 1; and

FIGS. 3 and 4 are enlarged views of a single equalizer coil as seen in FIGS. 1 and 2, respectively.

A commutator for a DC motor or generator is illustrated in FIGS. 1 and 2 and is of a generally conventional design having a shell member 11 suitably mounted as by press fit to a motor shaft 12. An assembly of commutator bars 13 are circumferentially arranged about one end of the shell 11.

Referring particularly to FIG. 2, the commutator bars have slotted riser sections 14 extending radially outwardly from their tang portions 16. The armature illustrated in FIGS. 1 and 2 is for use in a motor having four-pole design so that 180 mechanical degrees on the commutator are equivalent to 360 electrical degrees. The commutator has 174 of the circumferentially spaced commutator bars 14. Six of these bars are shown in some detail in FIG. 2 with sequentially numbered bars 1, 4, 7, 88, 91 and 94 being indicated in FIG. 2.

A partly complete arrangement of equalizer coils is indicated at 17 in FIGS. 1 and 2 and, in the present embodiment provides an equalizing connection formed at each third consecutive bar. The equalizing coils or members are circumferentially formed about an insulated support shelf 18 disposed behind the riser portions 14 of the commutator bars. A specific arrangement of the equalizer coils is illustrated in FIG. 2 with a first equalizer coil 21 having leg sections 21a and 21b respectively secured within the riser portion of commutator bars 1 and 88, respectively. A second equalizer coil 22 has legs 22a and 22b which are respectively connected with the slotted risers of the consecutively numbered bars 4 and 91. A third equalizer coil 23 has legs 23a and 23b respectively in electrical connection with the riser portion of the consecutively numbered bars 7 and 94. Central transition sections of the equalizer coils, from which their respective leg sections extend for connection to the various bars, are indicated respectively at 21c, 22c and 23c. Only the leg sections and central transition section of the equalizer coil 21 are indicated in FIG. 1 for purposes of simplicity. Additional equalizer coils are similarly arranged between the remaining bars of the commutator. The uninsulated end section of three additional equalizer coils are partly illustrated in FIG. 2 with respective leg sections for each of the additional equalizer coils being shown at 24a, 24b; 26a, 26b; and 27a, 27b. Thus, the equalizer coils 21 through 27 illustrate that there are two paths of equalizing current flow between each pair of interconnected commutator bars. For example, both of equalizer coils 21 and 24 provide electrical paths between commutator bars 1 and 88, commutator bars 22 and 26 between bars 4 and 91 and commutator bars 23 and 27 between commutator bars 7 and 94. From both FIGS. 1 and 2, it is apparent that the equalizer legs indicated by the letter a are connected with the commutator bars at the root of their respective slotted risers to form an inwardly disposed, cylindrically shaped course indicated in FIG. 1 by the A. The ends of the equalizer coil legs indicated with the letter b are connected with the slotted portion of the commutator bars at a radially outward position to form an outwardly disposed, cylindrically shaped course indicated by the letter B in FIG. 1. A cylindrically formed sheet 28 of suitable insulative material is preferably arranged between the concentric courses of equalizer legs to further prevent the possibility of cross shorting or abrasive interaction between the various equalizer coils.

Referring now to FIGS. 3 and 4 as well as FIGS. 1 and 2, the equalizer legs a and b of each coil are exposed at their ends for connection to the commutator bars and follow cylindrical and relatively angular paths (as seen in FIGS. 3 and 4) to their common transition section c. Each of the equalizer coils is preferably formed by copper and has a rectangular cross section with dimensions of 0.076 by 0.154 inch, for example. The conductive metal of the equalizer coil in FIGS. 3 and 4 is indicated at 29 with insulative material such as a glass sleeve 31 encasing the remainder of the leg sections A and B and particularly the transition section C. The equalizer coils are provided with the insulative sleeves prior to their being formed into the configuration shown in the various figures. The present invention provides an equalizer coil having minimum stressing or cold working particularly of its transition section c during its configuration or forming for assembly onto the commutator of FIGS. 1 and 2. As best seen in FIGS. 3 and 4, the transition section c of each equalizer coil is in the form of an outside curve exhibiting a generally constant degree of curvature between the points at which it is associated with its legs a and b. To further maintain the constant curvature of the transition section in view of the different radial positions of its legs a and b, the transition section c is also formed along a helical path (also best seen in FIGS. 3 and 4) so that the curvature of the transition section is constant both in its loop formation and the transition between the legs at different radial positions.

In this manner, there is minimum cold working or stressing of the equalizer coil to minimize the possibility of failure during operation. The continuous curvature of its transition section further permits preinsulation of the coil with the insulation being unaffected during forming of the loop for assembly onto the commutator. The helical formation of the transition section, together with the preinsulation permits a very compact equalizer coil arrangement as seen in FIG. 1. Finally, the closed loop in the transition section provides an expansion loop for accommodating expansion and contraction along the length of the equalizer coils during operation.

What is claimed is:
1. An elongated equalizing conductor formed for association with a rotatable armature of a DC electrical machine, the armature of a type having circumferentially arranged elements with at least one pair of the circumferentially arranged elements maintained in electrical equilization, comprising a pair of leg sections and a generally central transition section in conductive relation, the legs circumferentially extending from the transition section for conductive association with the respective elements, the transition section having generally constant curvature between points at which it is associated with the respective legs to result in minimum stress within the formed equalizing conductor.

2. The equalizing conductor of claim 1 wherein its leg sections approach the transition section at a selected angular relation and the transition section forms an expansion loop for accommodating expansion and contraction within the conductor.

3. The equalizing conductor of claim 2 wherein the transition section includes a generally closed loop.

4. The equalizing conductor of claim 1 wherein the leg sections are at least partly arranged on different concentric levels with the transition section being formed in a generally helical configuration to m inimize the overall radial thickness of the formed equalizing conductor.

5. The equalizing conductor of claim 1 wherein a single continuous member forms the transition and leg sections and is preinsulated at least along its transition section, the preinsulation being generally susceptible to electrical failure upon excessive flexure.

6. The equalizing conductor of claim 5 wherein the continuous member consists of a conductive metal with its preinsulation comprising insulative glass sleeving.

7. A plurality of the equalizing conductors of claim 1 having their respective legs arranged into two concentric courses at a selected angular relation and connected periodically to the circumferentially arranged elements of a lap wound armature, the transition section of the conductors having generally helical formations, alternate conductors including insulative casings and further comprising a cylindrically formed sheet of insulative material arranged between the concentric courses of equalizing conductor legs.

References Cited

UNITED STATES PATENTS 783,498  2/1905  Arnold et al. _____ 310—204
1,315,237  9/1919  Pearson _____ 310—204

MILTON O. HIRSHFIELD, Primary Examiner
L. L. SMITH, Assistant Examiner